Nov. 29, 1955 — C. H. THORESON — 2,725,097
RETRACTILE SAFETY BELT FOR CARRIER CONVEYANCES
Filed Jan. 16, 1953
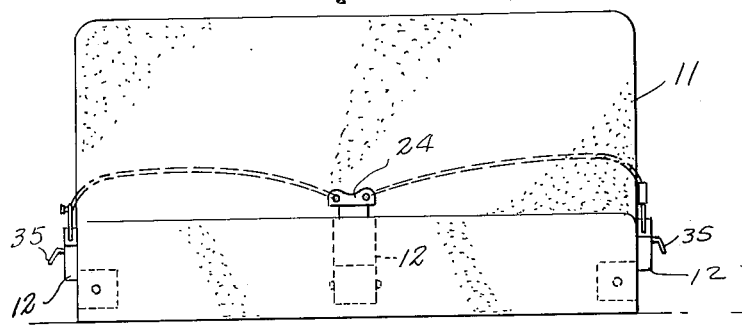
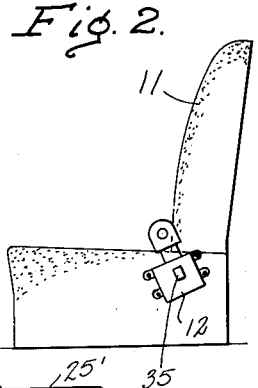
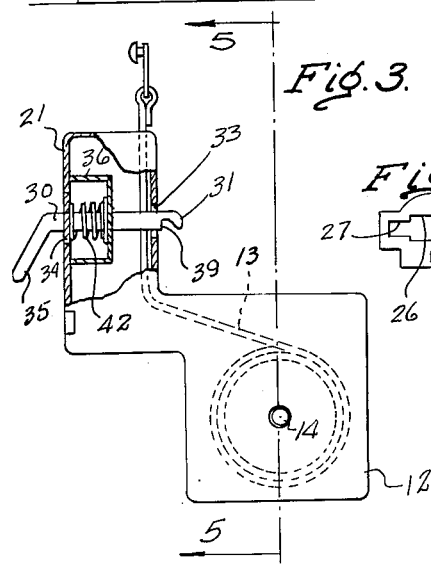
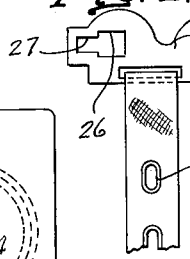
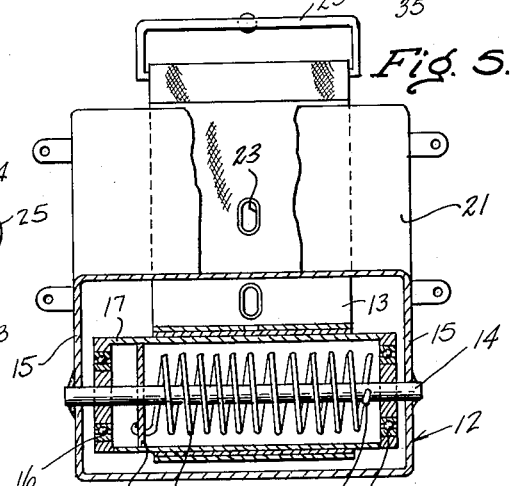
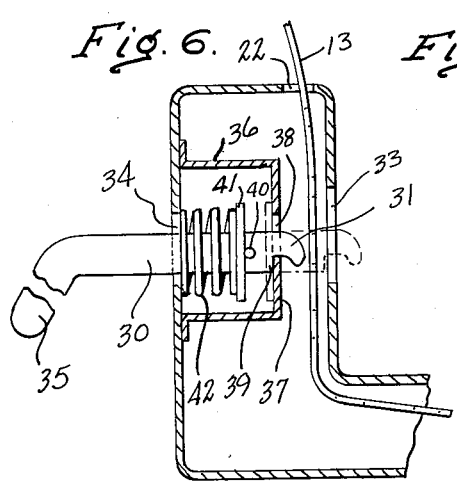
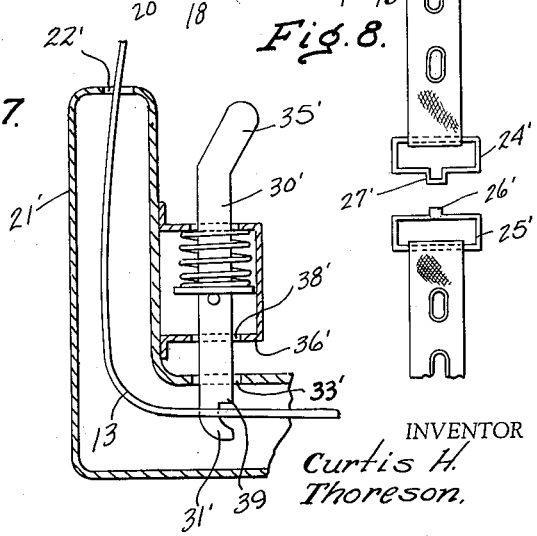
INVENTOR
Curtis H. Thoreson.
BY McMorrow, Berman & Davidson
ATTORNEYS.

United States Patent Office 2,725,097
Patented Nov. 29, 1955

2,725,097
RETRACTILE SAFETY BELT FOR CARRIER CONVEYANCES

Curtis H. Thoreson, Jackson, Minn.

Application January 16, 1953, Serial No. 331,553

3 Claims. (Cl. 155—189)

This invention relates to vehicle safety belts, and more particularly to an improved safety belt structure for an automobile.

A main object of the invention is to provide a novel and improved safety belt for a motor vehicle seat, said safety belt being simple in construction, being easy to install, and providing a means for adjusting the belt to a desired length, as well as releasably locking the belt either in an adjusted position or in a retracted position.

A further object of the invention is to provide an improved retractable safety belt for automobiles and other vehicles, said safety belt involving inexpensive components, being sturdy in construction, and being arranged to retract the belt when not in use whereby the possibility of the belt being caught between the door and the frame of the vehicle is virtually eliminated.

Further objects and advantages of the invention will become apparent from the following description and claims, and from the accompanying drawings, wherein:

Figure 1 is a front elevational view of an automobile seat provided with improved safety belt means according to the present invention.

Figure 2 is a side elevational view of the automobile seat of Figure 1.

Figure 3 is an enlarged elevational view of one of the safety belt reel housings employed in the structure of Figures 1 and 2, a portion of the housing being broken away to reveal details of interior construction.

Figure 4 is an enlarged detail view of a buckle element employed on the safety belt shown in Figures 1, 2 and 3, said buckle being attached to the end of the belt, the belt being shown broken away.

Figure 5 is a vertical cross sectional view taken on the line 5—5 of Figure 3.

Figure 6 is an enlarged vertical cross sectional detail view of the upper portion of the reel housing of Figures 3 and 5, the latch bar being shown in a retracted inoperative position.

Figure 7 is a vertical cross sectional detail view similar to Figure 6, but showing a modified form of reel housing wherein the latch bar is arranged vertically instead of horizontally.

Figure 8 is a fragmentary detail view showing the end portions of interengaging belt segments provided with modified forms of buckles in accordance with the present invention.

Referring to the drawings, 11 designates a conventional motor vehicle seat, and designated respectively at 12, 12 are housings secured to the respective opposite sides of the seat and containing respective flexible belts 13 which may be at times withdrawn from the housings 12 in the manner presently to be described.

Referring particularly to Figures 3, 4, 5 and 6, each housing 12 comprises a main portion of substantially rectangular shape in which is rigidly secured a horizontal transverse shaft 14, the shaft 14 being rigidly secured to the respective side walls 15, 15 of the housing in any suitable manner, as by welding or the like. Journaled on the shaft 14, as by suitable bearings 16, 16 is a hollow reel 17 containing the coil spring 18. One end of the spring is secured to the shaft 14, as shown at 19, and the other end of the spring is secured in a washer 20 rigidly fastened to the inside surface of the reel 17, said washer being rotatable on the shaft 14. The spring 18 biases the reel 17 relative to the shaft 14 to wind up the belt 13 thereon, one end of said belt being secured to the surface of the reel 17 in any suitable manner.

The housing 12 is formed at its upper portion with the laterally offset hollow auxiliary housing 21 whose top wall is formed with a slot 22 through which the belt 13 passes. The belt 13 is formed with the spaced locking apertures 23, and secured to the end of the belt is a buckle 24, shown in Figure 4, said buckle having a headed locking stud 25 and a keyhole-shaped stud-receiving aperture 26, the reduced portion 27 of the aperture 26 being adapted to lockingly receive the shank portion of the stud 25 of a mating belt section. As shown in Figure 4, the stud 25 is located at one side of the buckle 24 and the aperture 26 is located on the opposite side of said buckle, whereby two mating buckles may be locked by inserting the respective studs thereof into the respective opposing apertures 26 and then moving the buckles in opposite lateral directions relative to each other.

Alternatively, buckles such as shown at 24' and 25' in Figure 8 may be employed, said buckles being of the conventional type having a locking lug 26' on one buckle and a locking loop 27' on the other buckle adapted to receive the locking lug 26', said locking lug being inserted into the rectangular loop of the buckle 24' and then being engaged in the locking loop 27' formed in one of the elements of the loop 24', the locking lug 26' being then lockingly engaged in the loop 27' in the usual manner by rotating the buckle 25' from a position at a considerable angle to the plane of the loop 24' to a position substantially coplanar therewith, in which position the lug 26' becomes locked in the loop 27'.

Designated at 30 is a latch bar which is slidably mounted for horizontal movement in the intermediate portion of each auxiliary housing 21, said latch bar having the arcuately hooked end 31 which is engageable in a selected aperture 23 of the associated belt 13. The opposing walls of the auxiliary housing 21 are formed respectively with the respective apertures 33 and 34 through which the latch bar 30 extends, the outer end of the latch bar being formed with the downwardly inclined handle portion 35. Designated at 36 is a bracket member having the vertical arm 37, said arm being formed with the aperture 38 through which the latch bar 30 extends, the latch bar having the shoulder 39 which is at times engageable against the lower marginal portion of the aperture 38, in the manner shown in Figure 6 to retain the latch bar in a retracted position. Secured on the latch bar is the transverse pin 40, and disposed on the bar adjacent said pin is the washer 41. Designated at 42 is a coil spring which surrounds the latch bar and bears at one end on the washer 41 and at the other end on the wall of the auxiliary housing 21 adjacent the aperture 34, as shown in Figure 6. The spring 42 biases the latch bar to the right, as viewed in Figure 6, namely, to a position wherein the hooked end 31 of the latch bar may lockingly engage in one of the apertures 23 of the belt, locking the belt in a desired position of extension. To release the belt, the latch bar 30 may be retracted to the position thereof shown in Figure 6, and may be locked against the lower portion of the vertical element 37 of bracket 36, in the manner illustrated, the shoulder 39 being engaged against the inside surface of the margin of the aperture 38, as illustrated. The belt, being then released, will be retracted on the reel 17 by the action of the retracting spring 18, as above described. As shown in Figure 1, the respective housings 12, 12 are located on the opposite sides of the seat and the belts may be secured at their buckles 24 or 24', 25' so as to define protective means for the passengers occupying the seats. In the form of the invention specifically illustrated in Figure 1, an additional housing 12 is employed at the intermediate portion of the front of the seat, said housing being provided with an auxiliary belt similar to the belt 13 and provided at its end with a buckle similar to the buckle 24 shown in Figure 4, said buckle being interengageable with the respective buckles 24 carried by the belts 13 housed in the side containers 12, 12. Thus, the lug 25 of the belt on the left side of the seat may be engaged with the opening 26 of the buckle 24 of the intermediate housing 12, and the aperture 26 of the buckle on the right side of the seat 11 in Figure 1 may be lockingly engaged with the headed lug 25 of the buckle contained in the intermediate housing 12. This provides a means for employing the respective belts on the respective sides of the seat independently if so desired. When three persons are occupying the seat, the intermediate housing 12 is not employed and merely the belts contained in the respective housings 12 on the opposite sides of the seat are utilized for securing the passengers on the seat.

Referring now to Figure 7, the auxiliary housing for the belt container may be formed as shown at 21' with the belt 13 extending through a slot 22' in its top. The bracket member, shown at 36', may be secured to the outside wall of the auxiliary housing and the latch bar 30' may be positioned vertically as illustrated. The curved end 31' of the latch bar projects downwardly and through an opening 33' in the intermediate portion of the housing to engage in an opening 23 of the belt. When the belt is released, the latch bar 35' may be locked in a raised position by engaging its shoulder 39 against the marginal portion of the bracket adjacent to the aperture 38' of the bracket through which the latch bar extends, as illustrated in Figure 7.

It will be readily understood that the buckles 24' and 25' may be employed on the ends of the respective belt sections contained in the housings 12, 12 on the respective opposite sides of the seat 11, and that the belt section 12 contained in the intermediate housing of Figure 1 may be provided with a buckle such as shown at 24 in Figure 4. Thus, the buckle 25' on the left side of the seat may be provided with a headed locking lug 26' which is engageable in the opening 26 of the buckle 24 and the buckle 24' on the belt section at the right side of the seat, illustrated in Figure 1, may be provided with the locking loop 27' lockingly engageable with the headed lug 25 of the buckle 24. Therefore, with this arrangement, the belt section at the left side of the seat employs the buckle 25', the belt section at the right side of the seat employs the buckle 24', and the belt section contained in the intermediate housing 12 employs the buckle 24.

While certain specific embodiments of an improved safety belt structure for motor vehicles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a seat, a housing secured to a side of said seat, a reel journaled in said housing, a flexible belt wound on said reel, spring means biasing said reel to wind the belt thereon, said housing being formed with an opening through which said belt passes, the wall of the housing adjacent said opening being formed with a first aperture on one side of the belt, the wall of the housing on the other side of the belt being formed with a second aperture aligned with said first aperture, a latch bar slidably engaged in said second aperture and being lockingly engageable through said belt, and guide means secured in the housing between the belt and said second aperture slidably receiving said latch bar, said bar being at times engageable through said belt with the first aperture and being at other times retractable from the belt and being lockingly engageable with said guide means.

2. In a motor vehicle, a seat, a housing secured to a side of said seat, a reel journaled in said housing, a flexible belt wound on said reel, spring means biasing said reel to wind the belt thereon, said housing being formed with an opening through which said belt passes, the wall of the housing adjacent said opening being formed with a first aperture on one side of the belt, the wall of the housing on the other side of the belt being formed with a second aperture aligned with said first aperture, a latch bar slidably engaged in said second aperture and being lockingly engageable through said belt, guide means secured in the housing between the belt and said second aperture slidably receiving said latch bar, said bar being at times engageable through said belt with the first aperture and being at other times retractable from the belt and being lockingly engageable with said guide means, and spring means biasing the latch bar toward said first aperture, said guide means comprising an apertured bracket and the latch bar having a shoulder lockingly engageable with said bracket.

3. In a motor vehicle, a seat, and respective guard devices secured to opposite sides of the seat, each guard device comprising a housing secured to the side of the seat, a reel journaled in said housing, a flexible belt wound on said reel, spring means biasing said reel to wind the belt thereon, said housing being formed with an opening through which said belt passes, the wall of the housing adjacent said opening being formed with a first aperture on one side of the belt, the wall of the housing on the other side of the belt being formed with a second aperture aligned with said first aperture, a latch bar slidably engaged in said second aperture and being lockingly engageable through said belt, guide means secured in the housing between the belt and said second aperture slidably receiving said latch bar, said bar being at times engageable through said belt with the first aperture and being at other times retractable from the belt and locking engageable with said guide means, and spring means biasing the latch bar toward said first aperture, said guide means comprising an apertured bracket and the latch bar having a shoulder lockingly engageable with said bracket, and means for detachably connecting the free ends of the belt.

References Cited in the file of this patent

UNITED STATES PATENTS

| Number | Name | Date |
|---|---|---|
| 312,168 | Sanders | Feb. 10, 1885 |
| 796,616 | Thomson | Aug. 8, 1905 |
| 803,335 | Frisbee | Oct. 31, 1905 |
| 1,198,862 | McCormack | Sept. 19, 1916 |
| 1,240,240 | Mortara | Sept. 18, 1917 |
| 1,329,719 | May | Feb. 3, 1920 |
| 2,071,903 | Shively | Feb. 23, 1937 |
| 2,257,099 | Beirise | Sept. 20, 1941 |
| 2,468,560 | Kirkpatrick | Apr. 26, 1949 |
| 2,488,858 | Franz | Nov. 22, 1949 |